United States Patent [19]

MacQuivey

[11] Patent Number: 4,489,316

[45] Date of Patent: Dec. 18, 1984

[54] METHOD AND APPARATUS FOR MINORITY VIEW REDUCTION

[76] Inventor: Donald R. MacQuivey, 743 Gailen Ave., Palo Alto, Calif. 94303

[21] Appl. No.: 200,091

[22] Filed: Oct. 23, 1980

[51] Int. Cl.³ .............................................. G09G 1/00
[52] U.S. Cl. .............................. 340/700; 340/384 E; 340/754; 235/386; 434/351; 364/409
[58] Field of Search ............... 340/700, 706, 384 E, 340/711, 326, 327, 753, 754, 328; 235/50 A, 50 R, 51, 52, 54 F, 386; 364/409, 550, 551, 554, 574, 575, 577, 578; 434/350, 351, 352, 362, 335, 336

[56] References Cited

U.S. PATENT DOCUMENTS

| | | | |
|---|---|---|---|
| 2,092,119 | 9/1937 | Hopkins | 235/52 |
| 2,188,165 | 1/1940 | Thomas | 235/52 |
| 2,206,702 | 7/1940 | La Pierre | 235/52 |
| 2,373,511 | 4/1945 | Stanton | 235/50 R |
| 2,491,335 | 12/1949 | Rich | 364/409 |
| 3,281,823 | 4/1964 | Foresman, Jr. | 340/332 |
| 3,378,194 | 4/1968 | Wells | 235/52 |
| 3,666,873 | 5/1972 | Pincus | 434/352 |
| 3,744,712 | 7/1973 | Papadopoulos et al. | 235/52 |
| 3,748,646 | 7/1973 | Schultz et al. | 235/52 |
| 3,766,541 | 10/1973 | Gordon et al. | 235/52 |
| 3,818,448 | 6/1974 | Wilkins | 340/706 |
| 3,943,641 | 3/1976 | Dworetzky | 340/332 |
| 3,947,669 | 3/1976 | Simmons et al. | 340/332 |
| 4,023,729 | 5/1977 | Eaton | 235/52 |
| 4,210,908 | 7/1980 | Sakakibara | 340/754 |
| 4,290,141 | 9/1981 | Anderson et al. | 434/351 |
| 4,293,855 | 10/1981 | Perkins | 340/712 |
| 4,348,666 | 9/1982 | Ogita | 340/753 |

OTHER PUBLICATIONS

Littauer, "Instructional Implications of a Low-Cost Electronic Student Response System", Oct. 1972, pp. 69-71, Educational Technology.

Primary Examiner—Marshall M. Curtis
Attorney, Agent, or Firm—Limbach, Limbach & Sutton

[57] ABSTRACT

A method and apparatus are disclosed for minority view reduction including a plurality of user controlled assemblies each with means for producing a positive response, a negative responses and a system inhibit response, a group attitude indicator means for registering the collective user positive responses, negative responses and for inhibiting further registration of either positive and negative responses with any system disable response. Communication is provided between the group attitude indicator and each of the user control assemblies for indicating to the group the registered collective responses and inhibiting the registering means upon determination of any system inhibit response from any member of the group. The user control assemblies may be hand-held button panels or microswitch means positioned at the maxillary jaw muscles. The indicator means can be a column of lights or a pair of lights each of whose brilliance is controlled in accordance with the responses. The indicator can be means for producing sound. The system provides a teaching method and apparatus for active promotion of consensus by noting and reducing the size of any anonymously expressed minority. This is accomplished by modeling the resulting response from a group of persons as though it were the response from a single person.

11 Claims, 9 Drawing Figures

METHOD AND APPARATUS FOR MINORITY VIEW REDUCTION

This invention relates to a method and apparatus of identifying, modelling and/or promoting the anonymous consensual response from a group of individuals as though it were the response of support and/or opposition from a single individual.

BACKGROUND OF THE INVENTION

In small group meetings there are frequently persons who hold views or have feelings that they believe to be those of a minority. Often they will not voice these views because of uncertainty as to the extent to which their views or feelings are shared and the possibility of injecting unpleasantness into the meeting—either unpleasantness in the form of antagonism or embarrassment to themselves or unpleasantness from giving others a hard time. Also, they do not want their anonymity invaded.

The system considered here is designed to be helpful wherever it is desired to reduce uncertainty as to the size and nature of minority views and to reconcile them as much as possible with those of others in the group. It probably will not be applicable in all groups. However, in most groups, in addition to expressed negative views, there are certainly many anonymous negative feelings that have seldom surfaced in the past, yet later, because they were not reconciled at the time, they are responsible for seemingly nonrational actions by those same group members.

There is great need to bring out suppressed views and identify the size and nature of the groups holding them without invading their anonymity. Only by doing so can the underlying problems be addressed and reconciliation of views truly be realized.

Not only is the expression of negative views and feelings troublesome in themselves, the fact that everyone must take turns in expressing whatever views they have, positive or negative, is a source of tension and delay that is substantially unrecognized because people assume there is no satisfactory alternative. However, this is no longer true.

Because major sources of delay and frustration in group discussions include the need to take turns in the discussion, responses from all persons, except one, are out of phase with the statements made. In contrast to the informality of conversation in a twosome, statements made by one person to a group do not usually anticipate an immediate response from "all" the rest. Their nature, instead, is expository, in general terms, and expressing only one's own view on the subject, with no expectation of any immediate response or a complete response until several others are heard.

Because all persons normally do not respond at once and everyone knows that what one may say, when one's turn comes, may not be as relevant then as if it could be given currently, many people are discouraged from participation at all. In fact, they often are influenced to go along with the views of those who succeed in being heard, simply because the mechanism for the exchange of views is inadequate and not because they really support those views.

Not only is the current mechanism for exchange of views inadequate in measuring and displaying those views, there is no built-in encouragement toward consensus. Various electrical voting systems have been designed to overcome the display deficiency and may measure quite adequately the extent to which various views are held. However, the simple measurement and data processing of existing views does little to promote consensus directly or positively.

There is need, also, during composure of views prior to measuring the extent of consensus, to encourage each participant to give positive consideration continuously to what others may feel at the moment and express himself or herself in a way designed to move toward consensus. This may take the form of an attempt to articulate a presumed consensus in order to note its reception. Electric voting systems may measure that effort, but people must still do the encouraging. No existing equipment arrangement helps do that to any substantial degree.

Part of the solution to the problems outlined in the preceding paragraphs is to provide easy, anonymous, simultaneous electronic feedback of support or opposition from everyone, whenever desired, without adversely affecting what is going on. This provides a timely, though limited, simultaneous reply from all participants.

In addition to these features, most of which are included in one or another of the systems use described in prior art relating to voting systems, and which in effect measure the extent of consensus, the preferred embodiment of the present system provides means specifically designed to promote timely consensus.

Essential for this objective of timely consensus are means, in accordance with the present invention, whereby the system use may be inhibited temporarily by any member of the group, at any time, when the contemplated action is intolerable. This capability causes everyone who desires to continue use of the system (and to avoid it being inhibited) to give more consideration than heretofore to what the views of others may be on what he or she is about to say. Also, upon activation of this system inhibiting feature, the person doing so or someone else is obligated immediately to address the issue that was apparently intolerable. This may permit the person deactivating the system to reactivate it. These two characteristics, (1) consideration of the views of others in order to avoid inhibiting further use of the system, and (2) immediately addressing the problem which caused inhibiting of use whenever it does occur, both encourage consensus.

Apparatus used by group members in this method of reducing anonymous minorities in small groups must be as unostentatious as possible in order that the attention of group members be directed toward the display and away from each other. Myogenic-based controls should be hidden and substantially no motion should be required to reach and operate them. The displays themselves should appear as free of fixtures as possible in order better to represent a combined person or persons.

Further in support of modelling the group as a person is selection of display means which stimulate feelings at least as much as the intellect, if not more so. Rather than a numerical display or means for counting votes, precisely, the preferred display shows the relative heights of dots of light, or the relative brilliance of lights, or the relative repetition rates of diverse sound pulses for comparison of views. While these means for display do accurately reflect the quantitative comparison of views, their quantitative nature is deemphasized in favor of their qualitative character in order more effectively to reflect human feelings. Feelings are essentially non-quantifiable.

One may even argue that personal feelings are non-digital and therefore a yes/no digital-like response is inadequate. This is essentially true, and it is for this reason that a series of instantaneous, simultaneous yes/no responses, following closely one on another, can be used to compensate for this deficiency by refining the issue in a way that a single yes/no vote cannot. This is an essential reason why normal voting procedures and past voting machines are unsatisfactory in this simulation effort. In addition to the delay and formalism involved, a *chairman* must call for a vote of the group. A simulated individual responds spontaneously without a chairman as anyone will realize in comparing performance differences between a group and a twosome. A chairman may continue to be required in those instances when it is necessary to regulate who speaks to the simulated individual.

The most relevant and one of the most recent prior embodiments of some of the features of the preferred system is that described by Wm. W. Simmons and James A. Marquis for a Voting Machine in U.S. Pat. No. 3,947,669 issued Mar. 30, 1976. It provides, on request, a measure of consensus in terms of preference for each of a number of alternative answers and a selected degree of confidence in each selected answer. These answers are combined digitally in a computer, and several statistical characteristics are calculated and displayed on a TV monitor. As there is a down count when each vote is tallied, the system is not quite instantaneous but does operate quickly. It is not designed to facilitate conversation between a member of the group and the rest of the group in developing consensus, as is the system considered here, however.

The Simmons et al voting system relies on computer-based data processing to calculate the spectrum of views of the group using it. It does not seek but could provide a single dichotomy of view. As a result, considerably more mental effort would seem to be required to use it as compared with the binary system. As mentioned, because most questions cannot be finally answered by a simple yes/no response, quick reiteration is required in order to move rapidly toward consensus.

Simmons' concept is extended by Eaton, 1977, in U.S. Pat. No. 4,023,729 to provide character-by-character selection by majority vote to "form a message in response to an inquiry or other stimulus." This is an electronic version of what is sometimes called the Delphi Technique for developing a decision through successive iterations of voting between which the participants are informed of the results of the previous votes.

Eaton's concept still does not simulate a group as an individual nor does it incorporate a means for inhibiting the system if a user finds its use intolerable. Also, it would seem to require consideration of issues in strict order. It would appear difficult to jump back over several decisions to define a new concept picking quickly from a number of previous actions. The present invention would encourage any group member, at any time, to restate a presumed better basis for onsensus and check its reception by the group instantly.

The participation-presenter/audience reaction system described by D. P. Papadopoulos and T. L. Westbrook in U.S. Pat. No. 3,744,712 issued July 10, 1973, enables the views of selected members of the audience to be chosen for display to the presenter of a talk by an audience in order to feed back the averaged views of approval or disapproval in a continuous manner. Participants are not anonymous. The speaker may then adjust his presentation accordingly or respond to the audience response. There is no means for members of the audience to inhibit the system, however, if the anticipated response or subject matter is intolerable, nor is it designed to promote consensus or reduce minority size if divergent views appear. Further, the interaction still has the character of interchange between presenter and audience. The interaction is still characterized by a group of individuals rather than by the informality and concentration of interest as in a twosome. The presenter still expounds to the group and must formulate his questions to produce a single yes/no or binary response.

Professor Rafael Littauer has used a student-response system in his physics class at Cornell University. He published an article about it in *Educational Technology*, October 1972, 12 (10) 69–71. It is similar to the system described by Dworetzky, 1976, in U.S. Pat. No. 3,943,641 which also refers to this publication but the system is not itself designed for use in promoting consensus and has no means for temporarily inhibiting it for this purpose. It does permit instant student response with five pushbuttons which it then anonymously processes and displays the result to the instructor.

SUMMARY OF THE INVENTION

The object of this invention is to provide a method and means for promoting consensus by characterizing, determining and reducing anonymous-minority size in groups of people.

The method is unique in its use of the capability of each group member to inhibit the system (temporarily) to promote consensus among those who wish to continue use of the system. This feature is believed to be unobvious. One does not, normally, build something and include in it a means for inhibiting it. Any member may inhibit (tilt) the system at any time by simply squeezing the hand holding the user control assembly. This operates all buttons including the one especially used to inhibit the system. The others do not matter at this point.

The tilt circuit may be interrupted whenever use of the tilt capability disrupts the meeting so it can no longer function satisfactorily with it. The first question put to the group, however, when it is disengaged should be whether the group desires to override this "veto" of its procedure after which it proceeds accordingly. This may result in reverting to conventional group operation without using the system.

Users operate the system using either two or three pushbuttons. Use of single-pole pushbuttons requires three to indicate "yes", "no", and "tilt." By using two-pole buttons, two buttons suffice because completion of the "tilt" circuit is made through the second set of contacts when both buttons are pressed at the same time.

Responses are indicated by light-emitting diodes arranged in columns so all persons in the meeting may see at least one green and one red column. Normally only the highest LED is lit to show the number of persons expressing a view. However, if it is desired actually to count them, all lower LED's may be switched on.

The method is also unobvious in the application of its simultaneous response capability, to approve or oppose, to overcome the characteristic out-of-phase character of normal group interaction. It permits the combination of timely, instantaneous, anonymous, and simultaneous responses to simulate the informal interaction of a twosome, thus overcoming to a substantial degree, the previous tendency to refer difficult questions to committee before substantive consideration. The informality of the simulated-twosome character of group interaction using the system can, in many instances, satisfactorily replace the desire of individuals to engage in twosome discussions before giving substantive consideration to an issue.

Related to the use of the system in modelling the group as an individual is the use of wearable myogenic based user control switches. In this regard, it is important that they be activated almost involuntarily. Squeezing the hand on all pushbuttons, rather than one, to "tilt" the system is an example of this response. Locating the buttons so one does not have to think, unduly, to reach for and to push the right one is another need met by the preferred design. It also makes easier the introduction of the system to newcomers. Wearing a headpiece containing microswitches activated by the maxillary muscles of the jaw and permitting clenching the teeth to operate the "tilt" feature is also in line with this objective. It frees the hands completely. There are not many locations on the body where such controls may be located, and their use in this way to promote consensus is believed to be unobvious.

DESCRIPTION OF THE PREFERRED EMBODIMENT

Referring now to the drawing, there is shown apparatus used in accordance with this invention to promote consensus by reduction of anonymous minorities in groups. The invention is applicable to various different user controls and group attitude indicators but for purposes of illustration will be described with respect to the preferred embodiment utilizing a hand-held control and a centrally observable light indicator.

Figures 1, 2:
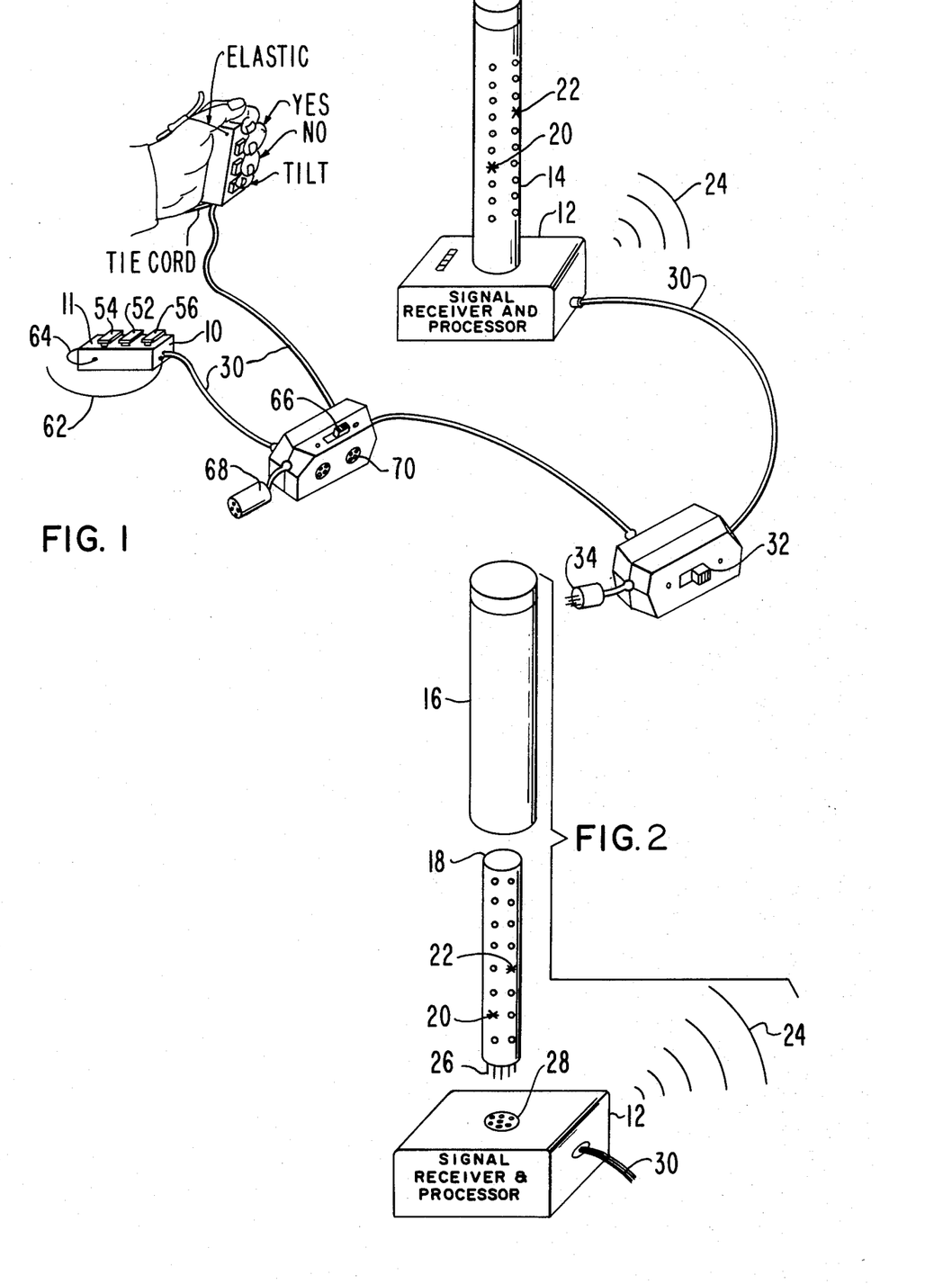
FIG. 1 is a schematic perspective view of the apparatus in accordance with the present invention.
FIG. 2 is an enlarged, exploded view of a portion of the apparatus shown in FIG. 1.

FIG. 1 illustrates one each of the major components in the apparatus. Each group member wears one of the hand-held user control assemblies 10 connected to the signal receiver and processor 12 by cables 30. The user control assembly 10 comprises a miniature button or key panel 11 provided with three operable buttons 52, 54 and 56 for connection in the system to register respectively a "no" or negative response, a "yes" or positive response, and a "tilt" or system inhibit response preventing further display of registered collective positive and negative responses. The button panel fits in the palm of the user's hand and is provided with an elastic tie cord 62, 64 to go around the back of the hand to hold the key panel in place in the palm where the user can press the buttons without observation by the other members of the group. At any time the user may press one or more of the push buttons 52, 54 or 56.

The signal receiver and processor 12, to be described in greater detail below, receives the responses from the various user control assemblies 10 and registers or presents the collective responses with a group attitude indicator means which, in the preferred embodiment includes both red and green light emitting diodes 20 and 22 respectively, and sounds graphically illustrated as 24. The lights and sounds can be used separately or together.

Each time a "no" button 52 or "yes" button 54 is pushed, one of the red or green lights 20 or 22 will usually move up the display 14 one position. They may be thought of as "stop" and "go" lights. If a user is the first person to indicate such a view, he will cause the lowest light to appear or to move. If he is the last of ten or more voting alike, the tenth person will cause all the lights in that column to glow and, possibly, flash on and off, similar to "tilt."

In groups of less than ten the display may be adjusted to show this complete column response as unanimity of view depending on the number of persons, less than ten, that are present.

If any member, alone, pushes the "tilt" button 56 on his control assembly 10, it will cause all the "no" lights to flash rapidly, and no one else can use the display effectively until he releases his tilt button. Each time there is a change in the visual display 14, there will also be a change in a distinctive sound to correspond to that change. A change in the "yes" or supporting view will be indicated by the appearance of a pulsed tone 24 or an increase in its pulse-repetition frequency (PRF). The pitch of that tone may be controlled to distinguish each of several systems that may be used at the same time. For example, a low-pitched tone might indicate a system used by a group of men, and a higher-pitched tone might indicate a system used in the same room by a group of women. The "no" or opposition view is indicated by a pulsed tone of approximately the same pitch but with added noise. The PRF of this composite noise/pitch tone indicates the size of the opposition. The aural equivalent of tilt is indicated by a composite continuous noise-and-tone sound, or a very rapid series of pulses with noise.

The tilt or "inhibit" capability may, itself, be turned off by operating the tilt suppressor or inhibit override switch 66 to open the tilt circuit in the four-wire cable 30 to all members. This will distinguish it from a unanimous "no," if necessary, as the "no" remains on.

Additional group members may be added to the system at any time without affecting its operation. They simply plug their control assemblies 10 into sockets 70 in junction boxes between sections of the cables 30. Additional cables may also be plugged into these junction box sockets 70 or line sockets 68 at the convenience of the users.

A further characteristic of the present invention is that the overall size of the group which may use the system is not significant. No need exists to measure all votes because the significant votes are only those of the minority. While these votes may come from anyone in a sizable group, the objective in measuring any votes is simply to show, in a timely way, the current size of the minority, so that group effort may be directed toward reducing its size as much as possible. Essential to this end is to identify it quickly and learn what currently bothers those people.

If the minority is not small enough to show on one display, the group is so polarized that composition of the apparent differences is not possible as the issue is currently stated. An alternative statement must be developed that brings the minority within range of observation. This limited display also encourages consensus, however, not just measures it. If polarization of the group persists, or is known to be present from the start, multiple systems having distinctive tones should be used.

The various factions may be combined by using a completely independent system operated by the spokesmen for each faction if, for example, several delegations are meeting in plenary session in an international conference. This may be required when the views of spokesmen must temporarily, at least, remain anonymous to everyone, including the delegations they represent.

When faced with a polarized group it may be desirable to combine separate systems used by each faction into a single system. Each faction may, first, operate its own system to reduce minority views within itself and then all may be switched to join in controlling a single minority sensor and display, if desired. A systems-combining switch 32 in the cable 30 connection to the group attitude indicator 12, 14, disconnects the network of users from the local display and connects that network to another system when a plug 34 from the systems-combining switch is plugged into that system. For example, a group of men and women could have one group attitude indicator for men and another for women, each with a systems-combining switch and cable to a third group attitude indicator having its own distinctive pitch. That third group attitude indicator would then show the undifferentiated views of the combined group when both local combining switches 32 are thrown to that third system.

The systems may also be combined in a different way to provide an automatic "electoral college" in which the majority view of the local group is automatically transferred as one of the individual inputs to a system at the next higher level in a heirarchy of systems. This is accomplished by comparing the size of the "yes" and "no" local comparator chain input or outputs which control the local display and generates a corresponding signal as input to the combining system. By this means instant relay of local views, possibly through several levels, into a larger group of indeterminate size is accomplished. A overridable "tilt" response or "abstention" is forwarded if both "yes" and "no" local responses exceed the capability of registration on the local display. Again the possibility of such a "tilt" response is an incentive toward consensus in the larger group if all wish to continue use of the system.

A prominent characteristic of the present invention is its modelling of the group as a simulated individual who is limited to expressing two views, generally approval or disapproval. This simulated individual operates to change the characteristic interactions in a group to be more like the characteristic interactions with a twosome. These latter interactions are more informal and, when considered together with the anonymity of the persons making up this simulated individual, they permit bringing out many factors in a discussion that previously were extremely difficult to handle in any kind of group, including twosomes. An example of this is the simple question of moving on to another subject—such as going home.

FIG. 2 shows an exploded view of the signal receiver and processor 12 and indicator display 14 which, together, comprise the minority sensor and display. LEDs 20 and 22 are arranged in vertical columns around an internal cylinder 18 so that at least one red and one green column may be seen from any location in the room when the display is set in the midst of the group. The internal cylinder 18 on which the LEDs 20 and 22 are mounted is painted black in order to enhance the contrast for each light. The outer cylinder 14 is translucent to the lights but spray painted very lightly with black paint to hide all LEDs that are not lit. When quiescent, therefore, the system shows a minimum of distracting elements.

The reason for this is to encourage reference to the display as though it were an individual—almost as though it were another member of the group. All controls are hidden for the same reason. A plug 26 and a matching socket 28 on the signal receiver and processor base 12 have enough pins to accommodate ten "yes" levels of LEDs, ten "no" levels of LEDs and a common line. The parts are separable in order to facilitate packing and portability of the system.

Figure 3:
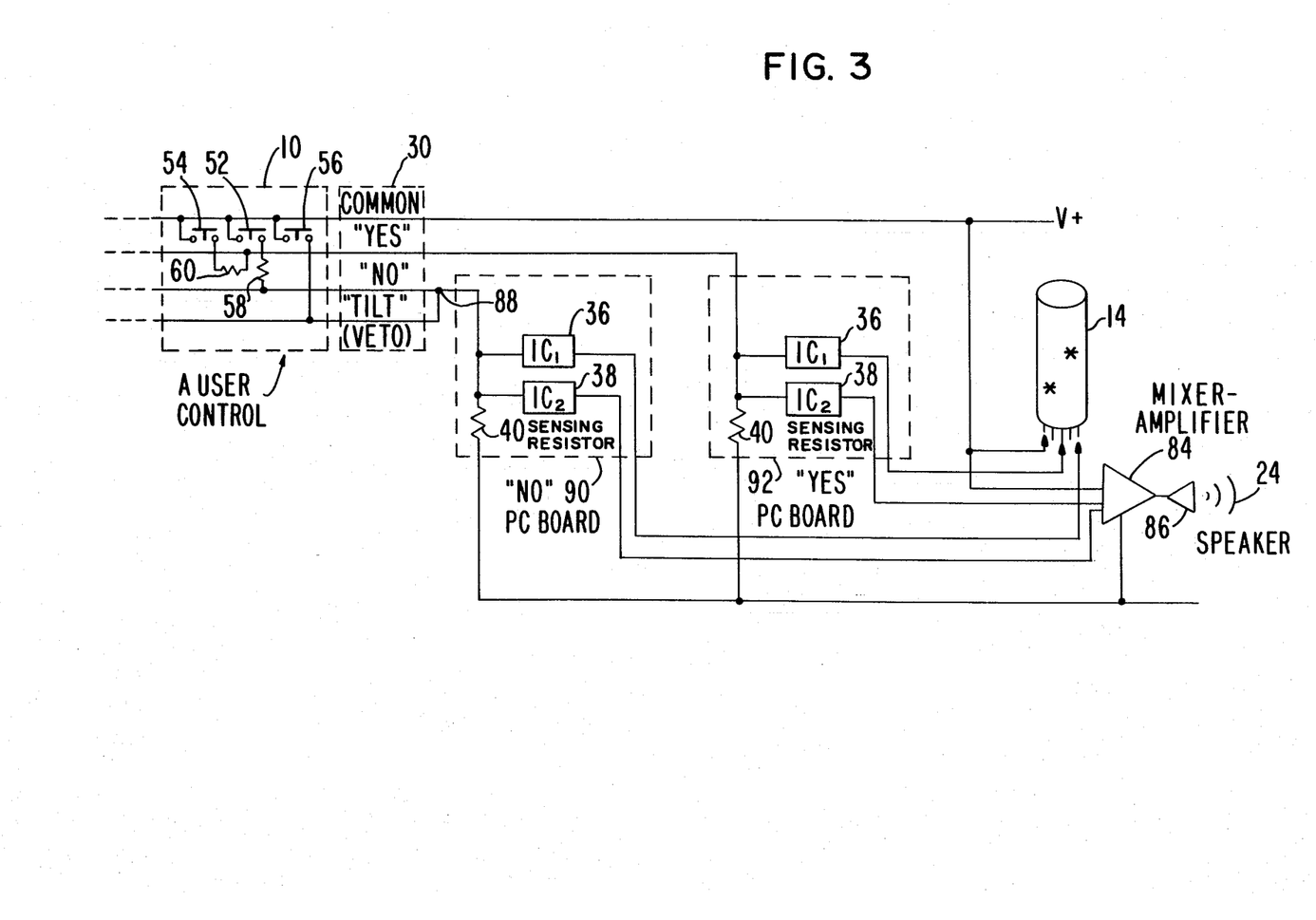
FIG. 3 is a circuit diagram illustrating the details of the voting and disabling functions of this invention.

FIG. 3 details the voting and inhibiting functions. Four-wire cable 30 interconnects all users with the minority sensor and display. Segments of the cable can be plugged together at random and interspersed with junction boxes with user-control assemblies spaced as desired.

Sensing of "no" and "yes" votes is accomplished by change in the voltage across minority sensing resistors 40 on both PC boards 90 and 92 as buttons 52 or 54 are pushed to connect the voting resistors 58 or 60 into the circuits. All "no" voting resistors 58 are connected in parallel as a group, and the group is connected in series with the "no" minority sensing resistor 40 on the "no" PC board 90 as each member indicates opposition. Similarly, all "yes" voting resistors 60 are connected in parallel, and the group of them is connected in series with the "yes" minority sensing resistor 40 on the "yes" PC board 92 as each member indicates approval. Each voting resistor 58 or 60 has approximately 100 times as much resistance as the minority sensing resistors 40. Consequently, as the first ten, or so, votes are applied to the circuit, the change in voltage across the minority sensing resistors 40 changes in a substantially linear way. This is important as the dot/bar display driver, IC1 36, must have a substantially linear input in order to turn on the LEDs properly on a one-to-one basis with the votes.

The same voltage across the minority sensing resistors 40 is used to control the pulse-repetition (PRF) of the pulse generators in the complex noise generators IC2 38. Details of these functions are illustrated in FIGS. 4 and 5.

Figure 4:
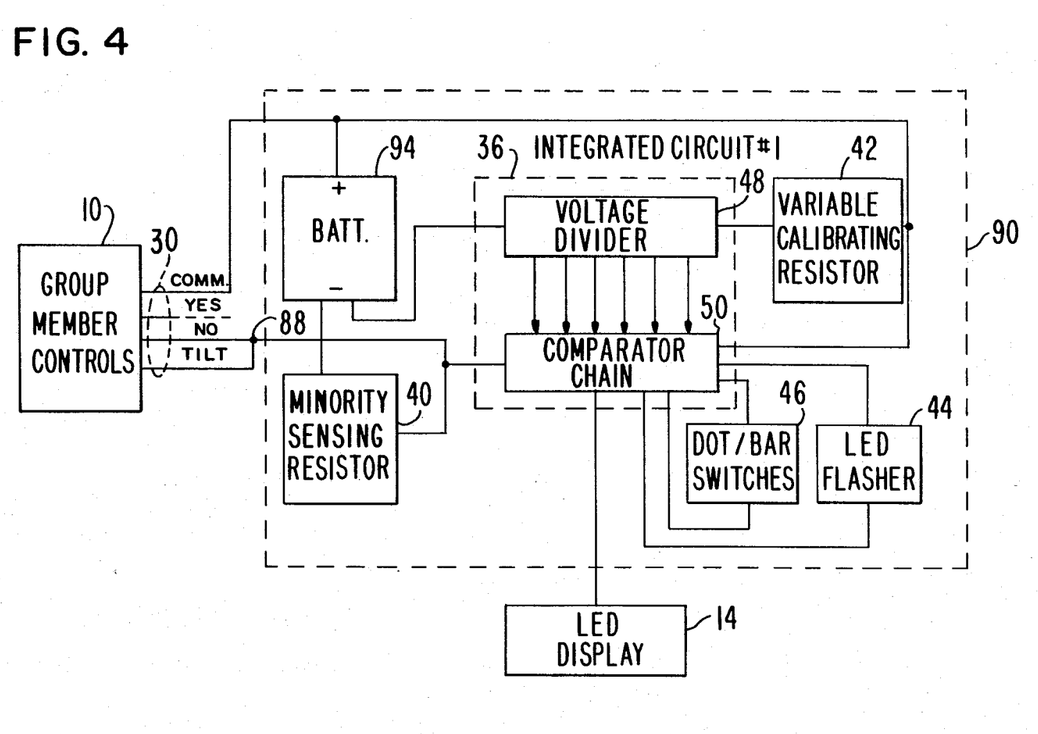
FIG. 4 is a circuit diagram in block form illustrating the visible display-signal processor utilizing one channel.
Figure 5:
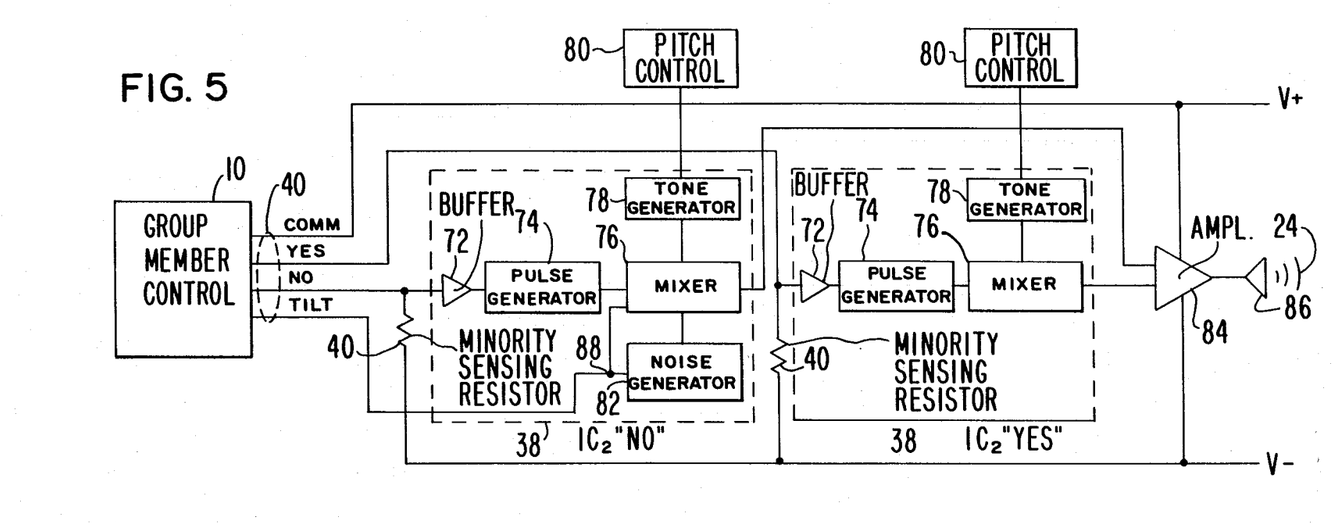
FIG. 5 is a circuit diagram in block form of an aural display-signal processor.

FIG. 4 details the processing of signals for the visual display 14. The voting voltage developed across the minority-sensing resistors 40 on each PC board controls the operation of the dot/bar display driver integrated circuits 36 to turn on successive stages in the comparator chain 50 of those ICs. In turn, these light LEDs 20 and 22 in the visual display 14 and change the PRF of the pulse generators in IC2 38 discussed below under FIG. 5.

The tilt, or inhibiting, function results from pressing any tilt button 56. This applies a temporary short circuit 88 across all the "no" resistors 58. In order to short circuit all of them the tilt line in the cable 40 is connected to the "no" line at the input to the signal display and processor 12 as shown at 88 in the figure. The effect is to place full battery voltage 94 across sensing resistor 40 on the "no" PC board 90. This high voltage turns on all the comparators in the comparator chain 50 which, in turn, switches 46 the display from the single LED, or dot, mode to bar mode with all "no" LEDs 20 lit and it also turns on the LED flasher 44.

The variable calibrating resistor 42 in series with the voltage divider 48 establishes a series of discrete voltages against which each comparator in the comparator chain is related as the voltage across the minority-sensing resistor 40 follows the change in votes. As that voltage increases and exceeds the voltage to turn on a comparator in relation to the divider voltage, that comparator will turn on its related LED in the visual display 14. Adjustment of the calibrating resistor 42 is necessary to set the voltage increments along the voltage divider 48 so that each increment is just below that voltage necessary across the minority sensing resistor 40 which will turn on the particular comparator relating that number of votes to the number of the LED which is lit in the visual display 14.

FIG. 5 illustrates the relationship of the major elements in the aural signal-processing part of the invention. The major element is an IC complex-sound generator, IC2 38. It contains a super-low-frequency oscillator adjusted for use as a pulse generator 74, a voltage-controlled oscillator used as a tone generator 78, a noise generator 82 and means 76 for mixing the outputs from each of these. In addition, an operational amplifier 72, used as a buffer, is needed to turn the system on upon receipt of the first vote. Otherwise very slow pulses are generated when no one is voting.

A pitch-control variable resistor 80 permits adjustment of the pitch of the tone generated to simulate, as close as possible, the tone of voice of persons represented by the system, or otherwise identify the group. The circuits for generating approving pulses 74 are the same as for generating disapproving pulses 74 except for mixing 76 noise 82 with the latter. Of course separate pulse 74 and tone 78 generators are required for each channel.

Finally, the approving pulses at a PRF commensurate with the number of members expressing approval are mixed and amplified 84 with the opposing pulses at a rate indicative of the number of members in opposition and fed to the speaker 86 to be heard by everyone in the group 24.

ALTERNATIVE EMBODIMENTS

The above described embodiment has been reduced to practice in all essential features. Some alternative embodiments have, also, and yet others may be devised by those skilled in the art without departing from the spirit and scope of this invention. The following discussion relates to some embodiments of each of these catagories.

Figure 6:
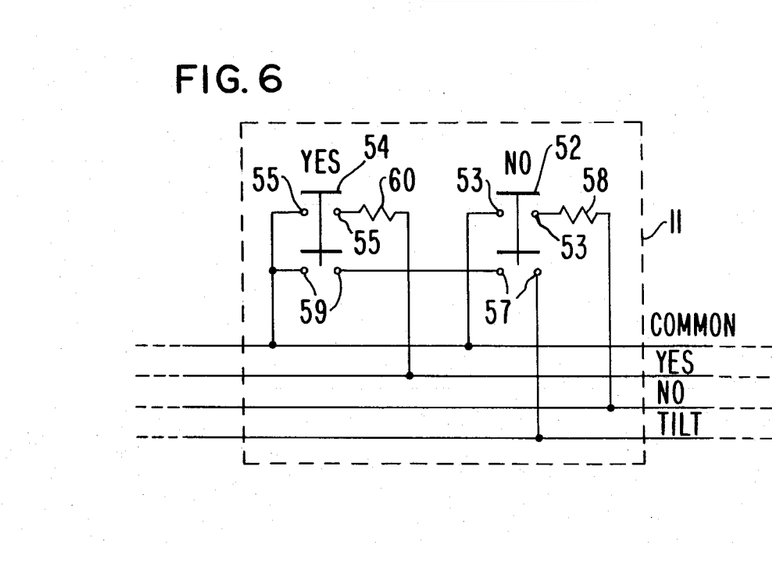
FIG. 6 is a circuit diagram of a two-button user control unit.

Operation of the user control-key panel 11 may be simplified by reducing from three to two the number of pushbuttons used. This requires using double-pole pushbuttons or dual microswitches to replace the single-pole switches. The arrangement is illustrated in FIG. 6. The second set of contacts 57 and 59 are connected as an AND circuit in series between common and "tilt" lines so that the tilt function is activated when both buttons are pushed simultaneously but not as each is pushed alone. As mentioned in discussing the preferred embodiment, one may activate the tilt function by squeezing all buttons as one might do almost involuntarily if the subject matter being discussed in the meeting becomes intolerable. Use of the two sets of contacts 57 and 59 on two buttons that must be pushed also makes less likely that the tilt function will be activated accidently by pushing involuntarily that third button, only.

Figure 7:
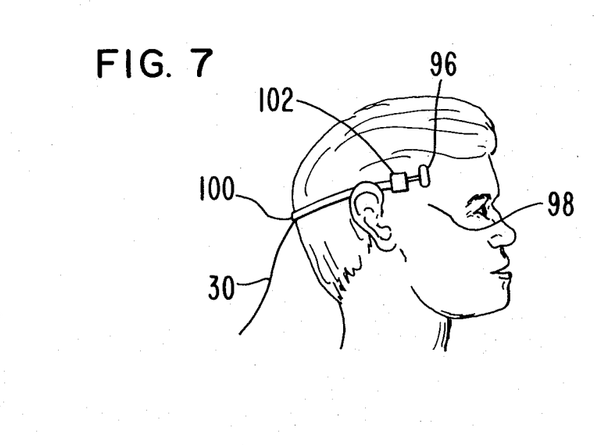
FIG. 7 is an elevational schematic view illustrating a maxillary-muscle activated user control unit.

Another alternative embodiment of the user control key pad 11 is to mount microswitches 96 as in FIG. 7, so that they may be worn on the head and operated by the maxillary jaw muscles 98 at each temple. Clenching the right jaw operates only the right switch, i.e. for "yes", and the left jaw for "no." Clenching both sides of the jaws at the same time operates all switches for "tilt." Clenching the jaw distends the maxillary muscle 98. Each single or double microswitch is adjusted relative to an adjacent firm location on the skull 102 so that distention of the muscle will cause the switch to operate. The switches are mounted on the ends of a circle comb 100 such as is often worn by girls to keep their hair in place but, in this instance, they may rest on the ears and go around the back of the head. They may, also, of course be adjusted to be worn over the top of the head as are headphones.

Use of the maxillary-muscle-operated user control assembly 96–102 frees the hands completely yet retains the capability for instant, non-obvious votes by each user at any time. It further facilitates modelling the group as an individual as those responses are instantly summed and displayed for comparison at one location.

Other myogenic-based controls may also serve. For example, integrated circuit sensors used in myograph systems may also sense approving or disapproving muscle action. Tape switches incorporated in footpads may be operated unostentatiously by persons seated around a table. It is desirable to give users a choice to meet their preferences.

Figure 8:
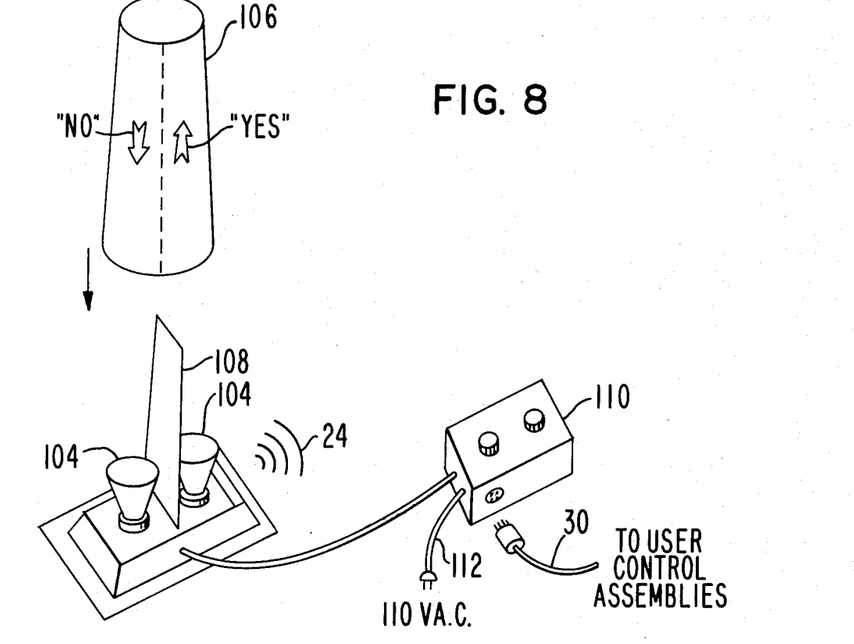
FIG. 8 is a schematic perspective view, partially exploded, illustrating a brilliance-controlled display in accordance with this invention.

In FIG. 8 an alternative embodiment of the anonymous-minority sensor display comprises control of the relative brilliance of two lamps 104 or sets of lamps. For example, two flood lamps may be mounted adjacent to each other and pointed upward under a tapered oval translucent tube 106. That tube looks much like the shade of a table lamp. Inside the tube and separating the light from each of the two lamps is an opaque divider 108. The relative brilliance measures relative group feelings of support or opposition. The brilliance of each lamp is controlled by a semiconductor-controlled rectifier (SCR) dimmer 110 similar to that frequently used for dimming residential room lights. The potentiometer controlling the dimmers is replaced or shunted by a parallel combination of resistors distributed in user control assemblies 10 among the group using four-wire cable 30. They are the same as those controlling the dot-bar display drivers IC1 36 in the preferred embodiment.

The values of voter resistances 58, 60 are chosen so that the application of the first few in parallel will change the range of brilliance in steps from just-perceptible to substantially-full brilliance. Of most significance, of course, are the first few votes either in support or opposition. Subsequent votes cause progressively smaller incremental changes in brilliance. "Tilt" is indicated by one member short-circuiting 118 both banks of voting resistors by means of a DPST relay 116 to bring both floodlamps 104 to full brilliance after which no member may make any further change.

Figure 9:
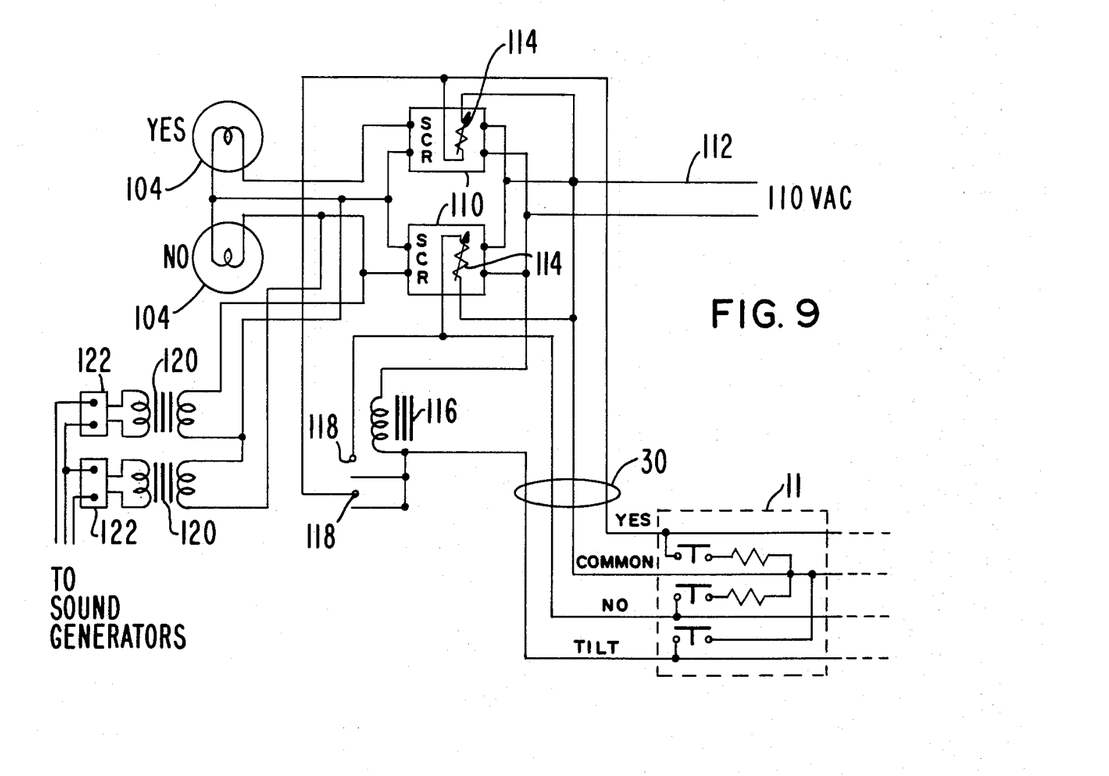
FIG. 9 is a circuit diagram for a brilliance-controlled display.

The "voice" of this embodiment, as with the preferred embodiment, is the same combination of sounds from a complex-sound generator, IC2 38. In this instance, however, they are controlled by opto-isolators 122 coupled through transformers 120 to each of the floodlight circuits. Incremental changes in brilliance cause incremental changes in the light in the related opto-isolators. These in turn, cause changes in the resistance of the incorporated photocells and those cell-resistance changes alter the PRFs of the pulse-generator sections of the complex-sound generators to change the rates of the "yes"-tone pulses and the "no"-tone-plus-noise pulses heard by the group to indicate approval and disapproval. Comparison of the pulse rates indicates the size and nature of any minority view. Again, the comparison emphasizes the qualitative rather than quantitative difference between the views, although they are quantitatively reliable also.

The wireless embodiment of this anonymous-minority sensing system substitutes an energy radiating system for the interconnecting cable 30. Each user control assembly incorporates a small battery-operated transmitter which transmits radio or infra-red pulses similar to the sound pulses of the aural system, to the central minority sensor and display. Means are also provided to distinguish "yes" from "no" pulses and pulses from different systems.

An alternate means for transmitting control pulses is to use detection of the ambient, a-c magnetic field from house wiring as a time base for common timing at all user locations and at the vote sensor. User-transmitted pulses may then be delayed by specific amounts of time before being transmited from the user control assemblies to the central receiver. These specific times identify time "windows" for "yes", "no", "tilt", "male", "female", etc. Inherent randomness from use of loose-tolerance electrical components in the user control assemblies permits individual responses to be separated and counted or integrated within each window as the pulse lengths are small fractions of the time interval covered by the window. Use of pulses rather than amplitude or frequency modulation of the transmitted energy may also reduce difficulties that might otherwise occur because of varying signal levels received at the central minority sensor, as well as reducing the average power required to be transmitted from each user.

A telephone-transmitted embodiment of the aural system is also an alternative to the preferred embodiment. Although it does not include a visual display, future use of two-way cable facilities for home reception of television would permit use of a complete audio/visual system. In this system the same type of tone (yes) and tone-plus-noise (no) pulses are generated by each person or group participating in a telephone conference.

Because the pulses are generated by each user, the process of integrating them differs from that used to control the PRF in the preferred embodiment. In this instance the tones generated at each user location are of a fixed repetition rate which is slow enough so that persons hearing them all together on the phone integrate them aurally in order to sense the number of persons who respond favorably and unfavorably. The "yes" tones from each location are as nearly alike as possible as are the "no" tone-plus-noise pulses so that they are anonymous to other participants. "Tilt" is indicated by transmission of a continuous stream of noise or rapid pulses by the telephone conference member desiring to disable the response system.

What is claimed is:

1. Apparatus for promoting consensus and teaching comprising:
   a group attitude indicator means including
   means for registering the collective user positive responses,
   means for registering the collective user negative responses,
   means connected to said positive response registering means for indicating positive responses,
   means connected to said negative response registering means for indicating negative responses,
   means for inhibiting operation of said positive response indicating means and said negative response indicating means, and
   means connected to said operation inhibiting means for indicating the system use is being inhibited,
   a plurality of user control assemblies, each control assembly having
   means for producing a signal representing a positive response,
   means for producing a signal representing a negative response, and
   means for producing a signal representing a system inhibiting response,
   means connecting each of said user control assemblies to said group attitude indicator means whereby said positive response signal means is connected to said positive response registering means, said negative response signal means is connected to said negative response registering means, and said inhibiting response signal means is connected to said operation inhibiting means, and
   means for overriding said operation inhibiting means.

2. The apparatus of claim 1 wherein each of said user control assemblies comprises a handheld button panel having buttons which when activated produce a positive response signal, a negative response signal and a system inhibit response signal.

3. The apparatus of claim 2 wherein said button panel comprises a pair of buttons connected in circuit whereby operation of one of said buttons will register a positive response signal, operation of the other of said buttons will register a negative response signal, and operation of both buttons will register a system inhibit response signal.

4. The apparatus of claim 1 wherein each of said user control assemblies comprises a pair of microswitch means and means for positioning said microswitch means at the maxillary jaw muscles on opposite sides of the head of the user, said microswitch means connected in circuit whereby operation of one of said switch means by the jaw muscle on one side of the head produces a positive response signal, operation of the other of said switch means on the jaw muscle on the other side of the head produces a negative response signal and simultaneous operation of both of said switch means by the jaw muscles registers a system inhibit response signal.

5. The apparatus of claim 1 wherein said indicator means includes columns of lights, the highest lit light of a column being an indication of collective user responses and means to cause all lights in a column to be lit when there is unanimity of the individual responses of all of the users.

6. The apparatus of claim 5 including means to cause all collective user response lights to flash when there is a system inhibit response signal from any user control assembly.

7. The apparatus of claim 1 wherein said positive response indicating means includes a positive response lamp and said negative response indicating means includes a negative response lamp, means for controlling the brillance of said positive response lamp in accordance with the collective user positive responses registered by said positive responses registering means and means for controlling the brillance of said negative response lamp in accordance with the collective user negative responses registered by said negative response registering means.

8. The apparatus of claim 1 wherein said indicator means includes means for producing a positive response sound, means for producing a negative response sound and means for producing a sound indicating a system inhibiting response.

9. The apparatus of claim 8 wherein said means for producing a response sound of one sense and volume includes means for changing the sound indicative of that sense by an amount indicative of the collective user responses of the other sense.

10. The apparatus of claim 8 including means for introducing said sounds into communication systems whereby said apparatus can be utilized at a distance from the users of the system.

11. Apparatus for promoting consensus and teaching comprising:

a group attitude indicator means including means for registering the collective user positive responses, means for registering the collective user negative responses, means connected to said positive response registering means for indicating positive responses, means connected to said negative response registering means for indicating negative responses, means for inhibiting operation of said positive response indicating means and said negative response indicating means, and means connected to said operation inhibiting means for indicating the system use is being inhibited, a plurality of user control assemblies, each control assembly having means for producing a signal representing a positive response, means for producing a signal representing a negative response, and means for producing a signal representing a system inhibiting response, means connecting each of said user control assemblies to said group attitude indicator means whereby said positive response signal means is connected to said positive response registering means, said negative response signal means is connected to said negative response registering means, and said inhibiting response signal means is connected to said operation inhibiting means, a subgroup attitude indicator means for registering and indicating the collective user positive responses and for registering the collective user negative responses of a certain subgroup, and means providing communication between said subgroup attitude indicator means and a portion of the user control assemblies making up said certain subgroup.

* * * * *